April 20, 1965  E. G. GUILLORY  3,178,943
WIDE RANGE SELF-DAMPING PRESSURE GAUGE
Filed April 3, 1961

ELMER G. GUILLORY
*INVENTOR.*

BY
*ATTORNEY*

United States Patent Office 3,178,943
Patented Apr. 20, 1965

3,178,943
WIDE RANGE SELF-DAMPING PRESSURE GAUGE
Elmer G. Guillory, Lake Charles, La., assignor to Continental Oil Company, Ponca City, Okla., a corporation of Delaware
Filed Apr. 3, 1961, Ser. No. 100,377
4 Claims. (Cl. 73—397)

This invention relates generally to improvements in pressure gauges, and more particularly, but not by way of limitation, to an adjustable pressure gauge which is capable of a wide variety of full-scale pressure indications by a simple adjustment of the pivotal point within the gauge.

A pressure gauge may have its full-scale pressure reading varied in several well-known ways; for example, the tension of the range spring may be varied. The bellows or other pressure responsive means used to operate the mechanical linkage may be changed, or the mechanical linkage itself may be changed. The final result to be accomplished is that a full-scale reading can be obtained for any desired input pressure. However, one of the problems besetting the gauge manufacturer is that of linearity; that is, any variation in the full-scale pressure reading of the gauge must not upset the linearity of the scale throughout its entire range. A drastic change in the linkage, however, will introduce nonlinearity. This will then tend to limit the linkage adjustment to minor variations in full-scale pressure, or for calibration purposes. The replacement of the range spring is likewise limited since it must work in cooperation with the bellows that essentially actuate the system. Thus, a substitution of springs will generally require a change of bellows.

The substitution of bellows requires the entire gauge to be dismantled and rebuilt in a repair shop, since the bellows are generally confined in or secured to a pressure-tight chamber. Therefore, none of the systems heretofore used fulfill the requirement for an easily adjustable full-scale gauge indication.

It is therefore an object of this invention to provide a gauge mechanism that can be adjusted for a wide variety of full-scale indications. More specifically it is an object of this invention to provide a gauge which can be easily adjusted under field conditions and does not require transport of the gauge to a repair shop.

It is a further object of this invention to provide a gauge that will maintain its linearity throughout a wide variety of full-scale indications.

It is a further object of this invention to provide a gauge that has a sufficiently wide full-scale adjustment that it will substitute for a plurality of gauges heretofore required to be stocked, thereby greatly reducing the required gauge inventory.

It is a still further object of this invention to provide a gauge with an overrange protection device, thereby protecting the delicate gauge mechanism from excessive stresses.

This invention features a full-scale adjustable gauge having first and second chambers containing first and second bellows therein. A restrictive orifice provides communication between the bellows. An inlet is provided into the first chamber which, under normal use, is connected to the liquid to be measured. A substantially U-shaped fulcrum mounting means is mounted at the top of the second chamber and contains therein first and second fulcrum arms. The first fulcrum arm is flexure pivoted to one of the legs of the U-shaped mounting means and pivotally connected to the top of the second bellows. The other end of the first fulcrum arm is connected to a motion multiplying linkage means which indicates a variation in rotation of the fulcrum arm about the flexure pivot means. The second fulcrum arm is flexure pivoted at one end to the remaining upright arm of the U-shaped mounting means. The second fulcrum arm comprises a pair of parallel arms, each having a longitudinal slot parallel and opposite each other and adapted to confine a roller therebetween. The other end of the second fulcrum arm is spring biased. The roller is attached between the parallel members of the second fulcrum arm and has its periphery in contact with the top of the first fulcrum arm, thereby providing a mechanical couple between the fulcrum arms, such that when the roller is slid longitudinally along the slotted members of the second fulcrum arm, a variation in spring tension will be applied to the second bellows.

The invention also features a pin rigidly attached to the inside bottom of the first bellows which protrudes in an upward direction and is aligned axially with the restrictive orifice between the first and second bellows. The length of the pin restricts the total movement of the bellows and further closes off the orifice, terminating any communication between the first and second bellows, thereby limiting the movement of the second bellows and thus protecting the fulcrum and motion multiplying linkage from damage caused by excessive pressure surrounding the first bellows.

Further objects, features, and advantages of the invention will become apparent from the following description and claims when read in view of the accompanying drawings, in which:

Similar numbers will be used throughout all figures where common structural elements are shown.

Figure 1:
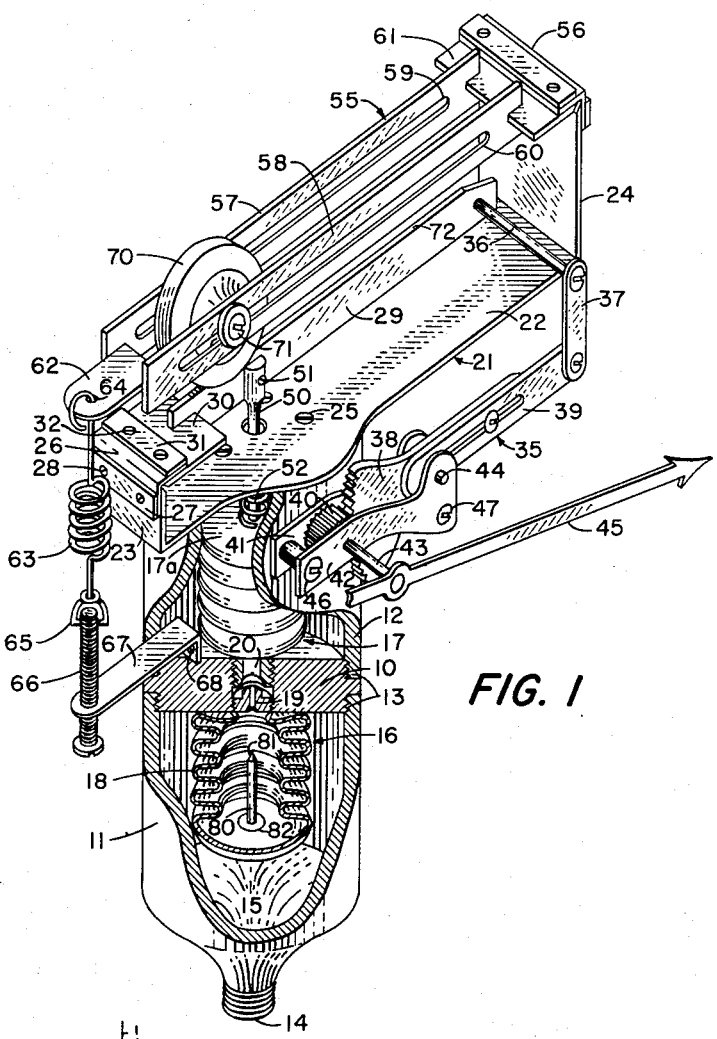
FIGURE 1 is a partial cross section of an isometric view of the adjustable pressure gauge.

Referring to the figures in general, and particularly to FIG. 1, a threaded metal disc 10 is shown having attached thereto a first pressure chamber 11 and second pressure chamber 12. Both pressure chambers are shown as hollow housings attached by a means such as threads 13; however, any well-known method may be used to attach the pressure chambers to disc 10. It is also understood that the pressure chambers and disc 10 could be constructed of a single unit provided by other means such as a threaded base to the pressure chamber. The lower end portion of chamber 11 is swedged downwardly and inwardly and has a pressure inlet 14 at its base for connection with a vessel (not shown) containing the fluid being measured.

Confined within chambers 11 and 12 are expansible, contractible, closed metallic bellows 16 and 17 which are threadably attached to disc 10. Each of the bellows contains convolutions such as 18 which permit the bellows to collapse axially. Each of the bellows has a small orifice member 19 and 20, respectively, threaded into a central bore in the disc 10 which provides communication between the bellows.

Mounted on the top and outside of second pressure chamber 12 is a substantially U-shaped fulcrum arm supporting means 21 which has a base 22 and first and second perpendicular members 23 and 24. Base 22 is attached to the top of pressure chamber 12 by any well-known method such as screws 25. A first fulcrum arm 29 is flexure pivoted at one end to perpendicular arm 23 by means of a flexible metallic strip 26 which is held to perpendicular upright arm 23 by a plate 27 and screws 28. A mounting plate 30 is rigidly attached at one end to fulcrum 29 and attached at the other end to flexible metallic strip 26 by means of a plate 31 and screws 32.

A mechanical multiplying linkage means 35 comprises a rod 36, a link 37, a gear segment 38 having an adjustable linkage 39, and spur gear 40. Spur gear 40 and segment gear 39 are mounted between a pair of plates 41 and 42 which provide supports for shafts 43 and 44 for the spur gear and segment gear, respectively. Shaft 43 is extended sufficiently to permit rigid attachment of a pointer 45. Mounting plates 41 and 42 are secured to the outside of second pressure chamber 12 by means of a screw 46. A screw 47 may also be used to retain the alignment of the mounting plates and pivots. The mechanical motion multiplying linkage 35 is connected to the first fulcrum arm 29 through rod 36 which is rigidly attached to fulcrum 29 at its extreme end opposite the flexible metallic strip 26 forming a flexure pivot.

A coupling rod 50 is rigidly attached to the upper end 17a of bellows 17 along the axis of the bellows, such that extension or contraction of bellows 17 will cause axial movement of rod 50. The remaining end of rod 50 is pivotally coupled to the first fulcrum arm 29 by pin 51. It may also be noted that a helical compression spring 52 is anchored between the upper end 17a of bellows 17 and the supporting means 21 around the rod 50 to reduce hysteresis of the bellows, as will appear below.

A second fulcrum arm 55 lies directly above the first fulcrum arm 29 and is pivoted about perpendicular upright 24 by a flexure pivot 56. Pivot 56 has identical structure to pivot 26 and therefore will not be discussed in detail. Fulcrum arm 55 comprises a pair of arms 57 and 58 parallelly spaced and having slots 59 and 60 longitudinally formed therein, respectively. Arms 57 and 58 are mounted in parallelly spaced relationship by transverse mounting plates 61 and 62.

The pressure gauge spring tension adjustment means is provided by a range spring 63 which is attached at one end to plate 62 through a hole 64 and at the other end through a rotatable clamping means 65 to an adjustment screw 66. Adjustment screw 66 is threadably held to the first and second pressure chamber assembly by means of a bracket 67 which is attached to the pressure assembly in any well-known manner, such as by screws 68 or rivets.

Mounted between arms 57 and 58 is a movable contact member 70 which is secured between plates 57 and 58 by passing a screw 71 through slots 60 and 59. Screw 71 may then be held securely by a nut (not shown). In the preferred embodiment, a disc type contact member 70 is journaled on the screw 71. However, it should be obvious to one skilled in the art that a wedge-shaped contact member could be employed wherein the sharp edge of the member is placed against the top edge 72 of fulcrum arm 29. Further, other methods may be employed to move the contact member 70, other than slots 59 and 60 and screw 71, such as, for example, contact member 70 could have a thread horizontally disposed therethrough and a screw attached between plate 62 and plate 61 and passing through the horizontal thread of contact member 70. This would provide a minute adjustment means for contact member 70, since a slight rotation of the thread would move member 70 by an amount determined by the pitch of the screw thread. For extremely accurate setting of gauges, this method would be preferred over the embodiment disclosed in FIG. 1.

A pin 80 having a point 81 may be securely anchored to the center of the lower end 82 of bellows 16, such that when the bellows 16 collapses a predetermined amount, point 81 will enter orifice member 19, closing the orifice off.

*Operation*

The operation of the pressure actuating portion of the gauge is similar to types now already in use and will therefore be only briefly described.

When a fluid having a pressure to be measured is admitted to the inlet 14, it is communicated to pressure chamber 11. The increase in pressure in pressure chamber 11 causes the convolutions 18 of bellows 16 to collapse, thereby forcing the internal liquid within the bellows 16 through orifice members 19 and 20 and into bellows 17. The increase in pressure within bellows 17 causes its convolutions to expand, thereby forcing coupling rod 50 against fulcrum arm 29. The pressure exerted by rod 50 against fulcrum arm 29 will cause fulcrum arm 29 to rotate counterclockwise about flexure pivot 26. The counterclockwise rotation of fulcrum arm 29 will cause a counterclockwise rotation of segment gear 38. This rotation of segment gear 38 will cause a clockwise rotation of spur gear 40, shaft 43, and pointer 45; the pointer thereby indicating an increase in pressure. The amount of travel that pointer 45 will exert is controlled by the counteracting pressure against rod 50.

The aforementioned counteracting pressure is created primarily by range spring 63 and the location of contact member 70 on the surface 72 of fulcrum arm 29. This is evident by reference to FIG. 2 where a simplified schematic of the pressure gauge is shown. Contact member 70, for convenience, is indicated by an arrow at point $a$, and dotted arrows at points $b$ and $c$ indicate second and third points where contact member 70 may be located. Distance $D_a$ refers to the distance between flexure point 26 and point $a$; likewise $D_b$ and $D_c$ refer to the distance between flexure point 26 and points $b$ and $c$. The pull of spring 63 is represented by force $F_1$, and the push of rod 50 against fulcrum arm 29 is represented by force $F_2$.

Figure 2:
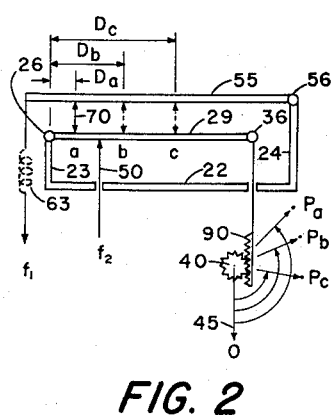
FIGURE 2 is a diagram showing the results caused by movement of the adjustable pressure point.

Careful analysis of the forces in FIG. 2 shows that for a constant force, the greatest force would be exerted by $F_2$ through the contact member 70 at point $a$ to act against spring 63 represented by $F_1$. Thus, with contact member 70 located at point $a$, spring 63 would be stretched the farthest, causing fulcrum arm 55 to pivot about flexure pivot 56 in a clockwise direction, thereby resulting in fulcrum arm 29 pivoting about flexure pivot 26 in a counterclockwise direction. Linkage 35 thus moves teeth 90 in an upward direction, causing spur gear 40 to turn by an amount represented by pointer 45 being at $P_a$. If contact member 70 were then to be moved to point $b$, the force exerted by $F_2$ would be less against fulcrum arm 55 than it was with the contact member located at point $a$. This would then cause less force to be exerted against spring 63 ($F_1$). With less tension against the spring, both arms 29 and 55 would rotate less than when the member 70 was located at point $a$—resulting in a less deflection of pointer 45, for example, at $P_b$. A movement of member 70 to point $c$ would further reduce the tension of spring 63 and, in the manner previously described, would cause a less deflection of pointer 45, for example, at $P_c$.

Figure 3:
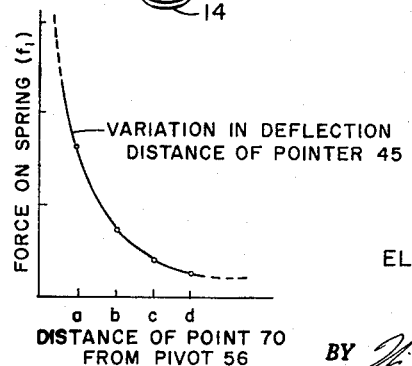
FIGURE 3 is a graph illustrating the variation in the deflection of the pointer caused by a variation in the setting of the pressure point when the input pressure surrounding the first bellows is held constant.

FIG. 3 shows an approximate graph of the variation in deflection of pointer 45 with a constant force, the only variable being the distance of contact member 70 from pivot 56. From the graph, it is clearly evident that a wide variety of pressure readings can be obtained by a variation in the position of contact member 70. It is also evident, however, that all the linkages are substantially short and straight. Thus, once contact member 70 has been set to obtain a predetermined full-scale deflection of pointer 45, the total movement of pointer 45 will be substantially linear. This linear requirement is highly important if a new gauge face is to be prepared for each new setting of pressure point 70. It will also be noted that the screw 66 may be easily adjusted to increase or decrease the tension on the spring 63 and "zero" the pointer 45 whenever the member 70 is moved to a new position.

A further feature of the invention is its protection from extreme overloads and leaks which is provided by the pin 80 perpendicularly positioned axially inside bellows 16. As bellows 16 collapses, pin 80 is forced in an upward direction. When bellows 16 has collapsed a predetermined amount, the point 81 of pin 80 will enter the mouth of orifice member 19, tightly closing same and preventing any additional fluid within bellows 16 from passing through the orifice members 19 and 20 into bellows 17. Since additional fluid cannot escape from bellows 16 to bellows 17, the movement of bellows 17 will cease, stopping the entire mechanism and thereby protecting same from overloading. Furthermore, the pin 80 will prevent leakage of the fluid being measured in the event either of the bellows should rupture. The orifice members 19 and 20 will further protect the gauge from rapid fluctuation, since they will not permit a rapid flow of fluid between the respective bellows. I have found that when the liquid used in the bellows 16 and 17 is glycerine, and when the orifice formed by the members 19 and 20 has an effective diameter of 0.007 inch, pressure fluctuations are effectively dampened. Also, the glycerine will not freeze, which is a valuable feature of pressure gauges.

Although this invention has been described with respect to particular embodiments thereof, it is not to be so limited, as changes and modifications may be made therein which are within the spirit and scope of the invention as defined by the appended claims.

I claim:

1. A pressure gauge for measuring the pressure of a body of fluid, comprising:
    a rod,
    pressure responsive means exposed to the body of fluid and connected to one end of the rod for moving the rod lengthwise in response to variations in the pressure of the body of fluid,
    a first arm pivotally connected, intermediate the ends thereof, to the other end of the rod,
    support means pivotally supporting one end of the first arm for pivotal movement of the first arm in the plane of the rod,
    pressure registering means connected to the other end of the first arm,
    a second arm,
    support means pivotally supporting one end of the second arm for movement of the second arm in a plane parallel with the plane of movement of the first arm toward and away from the rod,
    means for biasing the other end of the second arm in a direction for movement of the second arm toward the rod,
    contact means carried by the second arm in a position to contact the first arm and translate the force of the biasing means to the first arm for pivotal movement of the first arm toward the rod, and
    means for adjusting the position of the contact means along the length of the second arm for contact with the first arm at various points along the length of the first arm to vary the effect of the biasing means and vary the pressure range of the gauge.

2. A pressure gauge as defined in claim 1 wherein the contact means comprises a roller.

3. A pressure gauge as defined in claim 1 wherein the second arm comprises a pair of parallel arms supported in side-by-side spaced relation and having aligned, elongated slots therein; said means for adjusting the position of the contact means includes a shaft extending through said slots, and said contact means comprises a roller journaled on said shaft.

4. In a pressure gauge, the combination of:
    a pair of substantially horizontally extending arms arranged in vertically spaced relation,
    support means pivotally supporting one end of one arm and the opposite end of the other arm for movement of both arms in vertical planes,
    pressure responsive means pivotally connected to a medial portion of the lower arm for pivoting said arm upwardly upon increase of the pressure being measured,
    pressure registering means connected to the free end of the lower arm,
    spring means connected to the free end of the upper arm biasing said upper arm downwardly, and
    contact means carried by the upper arm for contacting the lower arm and counterbalancing the pressure being measured, said contact means being adjustably carried by the upper arm for varying the counterbalancing force imposed on the lower arm by the spring means.

References Cited in the file of this patent

UNITED STATES PATENTS

| 1,641,195 | Roucka | Sept. 6, 1927 |
| 1,723,548 | Heise | Aug. 6, 1929 |
| 1,868,018 | Miner | July 19, 1932 |
| 2,466,071 | Barnes et al. | Apr. 5, 1949 |
| 2,585,705 | Vetter | Feb. 12, 1952 |
| 2,695,981 | Smoot | Nov. 30, 1954 |
| 2,725,749 | Green | Dec. 6, 1955 |

FOREIGN PATENTS

| 1,178,475 | France | Dec. 15, 1958 |